(No Model.)

J. W. SWAN.
Electric Lamp.

No. 234,345.           Patented Nov. 9, 1880.

Witnesses
Chas. H. Smith
Geo. T. Pinckney

Inventor
Joseph Wilson Swan
per Lemuel W. Serrell
atty.

UNITED STATES PATENT OFFICE.

JOSEPH W. SWAN, OF NEWCASTLE-ON-TYNE, ENGLAND.

ELECTRIC LAMP.

SPECIFICATION forming part of Letters Patent No. 234,345, dated November 9, 1880.

Application filed June 16, 1880. (No model.)

*To all whom it may concern:*

Be it known that I, JOSEPH WILSON SWAN, of Newcastle-on-Tyne, England, have invented an Improvement in Electric Lamps and in the Materials Employed in their Construction, of which the following is a specification.

My invention relates to electric lamps in which light is produced by passing an electric current through a conductor of carbon, so as to render it incandescent, said conductor being inclosed in an air-tight and vacuous or partially-vacuous glass vessel.

It is well known that the practical efficiency of the kind of electric lamp above described has hitherto been impaired by the want of homogeneity and compactness in the carbon conductor, and by the imperfection of the contact betwixt it and the metallic conductors which convey the electric current to it.

I have found that an exceedingly solid homogeneous and elastic form of carbon, peculiarly adapted for the formation of arches, spirals, or other forms of conductor for electric lamps, can be produced from cotton thread which has been subjected to the action of sulphuric acid of such strength as to cause a similar kind of change to take place in the thread to that which takes place in bibulous paper in the well-known process of making vegetable parchment.

A kind of cotton thread suitable for being treated in the manner above described is known as "crochet" thread; but it must be understood I do not confine myself exclusively to the use of this particular kind of thread.

A suitable strength of sulphuric acid is formed by mixing together two parts of sulphuric acid, specific gravity 1.845, with one part of water. The cotton thread, after being immersed in acid of this strength, or thereabout, and allowed to remain immersed for just sufficient time to effect the change required, is then removed and quickly and thoroughly washed in water, so as to completely eliminate the acid.

Figure 1:
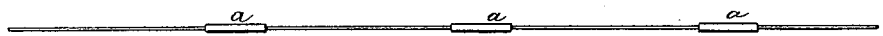
Figure 2:
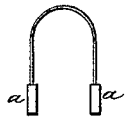

To facilitate and render more perfect the contact between the conductors which carry the electric current to and from the carbon, I take either the parchmentized thread above described or the thread without being previously parchmentized, and I wrap round it at suitable intervals strips of bibulous paper, as illustrated at *a*, Fig. 1, so as to thicken the thread at those places where the clips or other metallic attachments are required to make contact with it when it is converted into carbon and placed in the lamp, and I then treat the thread so prepared with the sulphuric-acid bath above described, so as to parchmentize the paper or other suitable form of cotton wrapped round the thread, and weld the whole into one mass, and after the required effect has been produced I wash away the acid with water, as before described. After the parchmentized thread has been washed and dried, I compress and flatten the ends, so as further to condense them and to give them a form suitable for being held firmly in a clip. I then take the pieces treated as above described, each with thickened end, and shape them into arches, spirals, or other forms suitable for the lamp required. Fig. 2 shows one of the pieces of thread with the thickened ends bent into the form of an arch. I then bury them in powdered charcoal or other form of carbon or air-excluding powder contained in a crucible or some suitable covered vessel of iron or earthenware, and I subject the whole to a high temperature—such, for example, as that of the pottery-biscuit kiln.

Thickening the ends of the carbon employed in incandescent electric lamps in the manner described is obviously also applicable to carbons formed from paper or other form of vegetable fiber.

Figure 3:
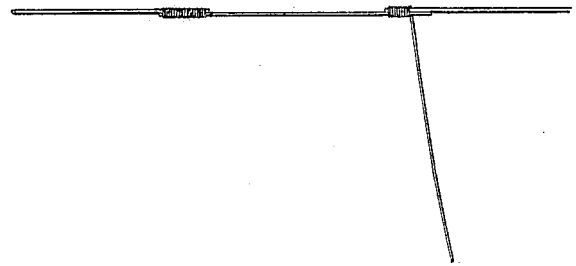

An alternative mode of attaching the carbon conductor produced as above described to the metallic conductors which convey the electric current to and from it consists in, so to speak, splicing the carbon and a wire or narrow strip of sheet-platina. This splicing I effect by laying together so that they overlap by about half an inch one end of the platina wire or strip and one end of the thread out of which a carbon spiral or arch is to be formed. The wire or strip and the thread are then bound together by a wrapping of cotton thread, as illustrated in Fig. 3, or by wrapping round them a strip of bibulous paper, so as to form several folds, and after both ends of the thread are so treated the whole is immersed in the bath of sulphuric acid, as above described, so as to parchmentize the thread and the wrapping. After washing and drying I shape the thread into the required form and carbonize it, as above described.

Having described the nature of my invention, I claim as new and useful—

1. Forming the carbon of an electric lamp from cotton thread which has, previous to carbonization, been subjected to the action of sulphuric acid, so as to produce the same kind of effect of semi-solution and the welding together of the cellulose fiber as is produced in making vegetable parchment from bibulous paper.

2. Forming carbons with thickened ends by welding together, by means of the process of parchmentization, the material, whether thread or paper, of which the carbon is to be formed and the material used to give increased thickness to the terminations.

JOSEPH WILSON SWAN.

In presence of—
  EVAN R. JONES,
    *United States Consul.*
  ROBT. ROWELL,
    *6 Grey St., Newcastle.*